Aug. 30, 1960 R. A. MAYNE ET AL 2,950,933
HUB
Filed April 15, 1957 2 Sheets-Sheet 1

INVENTOR.
Robert A. Mayne
BY and Arthur F. Leis
Dybvig and Jacox
THEIR ATTORNEYS Aug. 30, 1960  R. A. MAYNE ET AL  2,950,933
HUB
Filed April 15, 1957  2 Sheets-Sheet 2
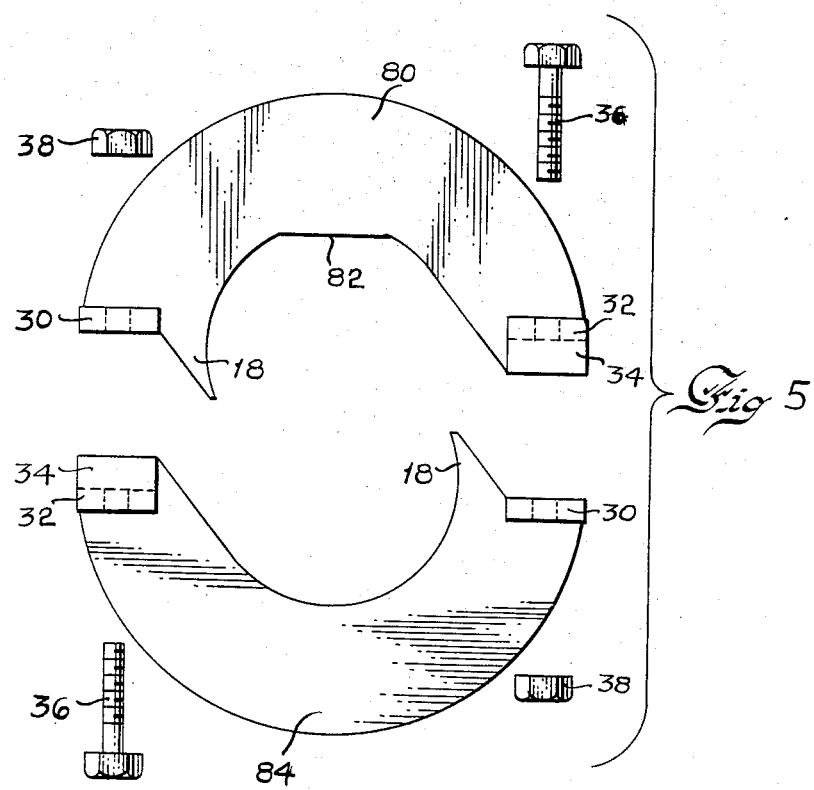
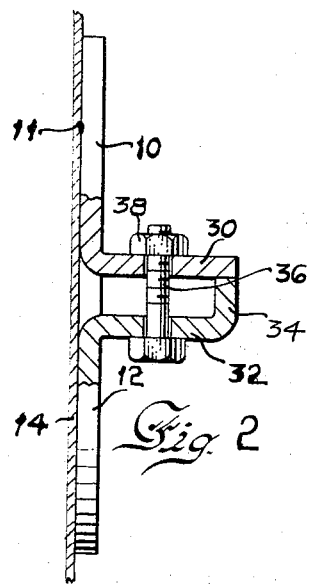
INVENTOR.
Robert A. Mayne
BY and Arther F. Leis
THEIR ATTORNEYS

United States Patent Office 2,950,933
Patented Aug. 30, 1960

2,950,933

HUB

Robert A. Mayne, 42 Forrer Blvd., Dayton 9, Ohio, and Arthur F. Leis, Dayton, Ohio; said Leis assignor to said Mayne Filed Apr. 15, 1957, Ser. No. 652,894

5 Claims. (Cl. 287—52.03)

This invention relates to a hub for use in non-rotatably attaching a part to a shaft.

In the manufacture of parts to be attached to a shaft, especially sheet metal parts, the hub for attaching the sheet metal part to the shaft is costly as compared with the sheet metal part that may be attached to the shaft. For example, in the manufacture of blower wheels where sheet metal discs are used, the cost of the hub is the most expensive piece going into the assembly, when compared with the relative weights of the parts.

An object of this invention is to provide a hub that may be made from stampings so designed that it is inexpensive to produce and at the same time dependable and efficient. In some installations, the shaft may be a smooth, round shaft. In others, the shaft may have a flattened portion or it may be provided with a key way.

Another object of this invention is to provide a hub made out of two sectors, at least one of which is provided with a surface complementing the adjacent surface of a shaft. If, for example, the shaft is provided with a flat portion, one of the hub sectors may be provided with an inner portion following a chord of a circle. In the event the shaft is provided with a key way, at least one sector may be provided with a key way complementing the key way of the shaft, so as to provide a key seat.

Another object of this invention is to provide one or both of the wedge-like portions of the sectors with a tooth or teeth adapted to gouge into the shaft, so as to hold the hub in a non-rotatable manner upon the smooth shaft.

Other objects and advantages reside in the construction of parts, the combination thereof and the mode of operation, as will become more apparent from the following description.

In the drawings,

Figure 2 is a fragmentary, cross sectional view, taken substantially on the line 2—2 of Figure 1.

Figure 4:
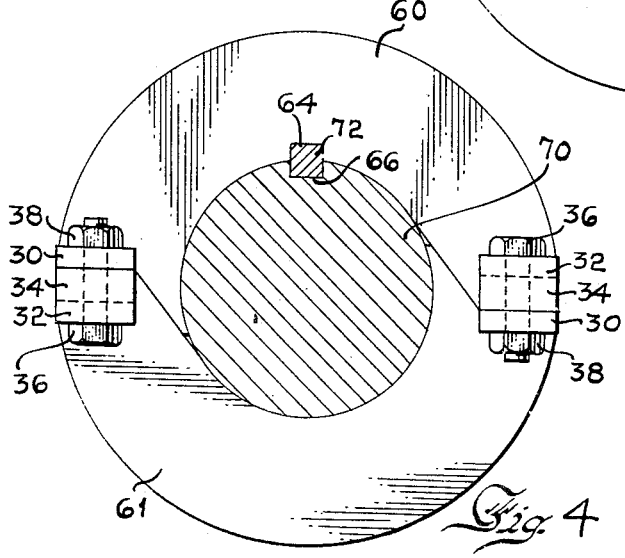

Figure 4 discloses another modification, wherein one of the hub members has been provided with a key seat.

Figure 5 discloses another modification, wherein one of the sectors has been provided with a flattened portion adapted to engage a flattened portion on a shaft.

The hub disclosed herein may be non-rotatably clamped upon the shaft or any other cylindrical body. This hub consists of two arcuate sectors cooperating to form a pair of clamping members. Each of said arcuate sectors has an inner cylindrical surface extending through an arc slightly less than 180°. One end of each sector tapers, so as to form a wedge-like portion. The inner surface of this wedge-like portion may be arcuate and the other surface extending along a straight line substantially along a tangent of the shaft supporting the hub. When the two sectors are clamped together by any suitable clamping means, the overlapping portions of the sectors cause the wedge-shaped portion to clamp upon the shaft. The clamping means may consist of ears formed upon both ends of the sectors, an ear of one sector cooperating with a complementary ear of another sector, the ears being clamped together by means of bolts, as may be clearly seen from the description that follows.

Referring to the drawings, the reference character 10 indicates one sector of a hub. A complementary sector 12 cooperates with the sector 10 to encircle a shaft. The sector 10 is spot welded or projection welded, as shown at 11, or otherwise secured to a metallic disc 14, as for example, a disc used in supporting a blower wheel, a pulley or the like. The sector 12 is not directly attached to the disc 14. Each of the sectors 10 and 12 is provided with a tapering wedge-shaped projection 18, the inner area of which is arcuate, as shown at 20. The arcuate surface 20 extends continuously on each sector through an angle approaching 180°. One margin or surface 22 of the projection 18 is tangentially disposed with respect to a shaft, not shown, passing through the hub. The opposite end 24 of each sector overlaps the tapering wedge-shaped projection 18. That is, the ends of the sectors are complementary.

Figure 1:
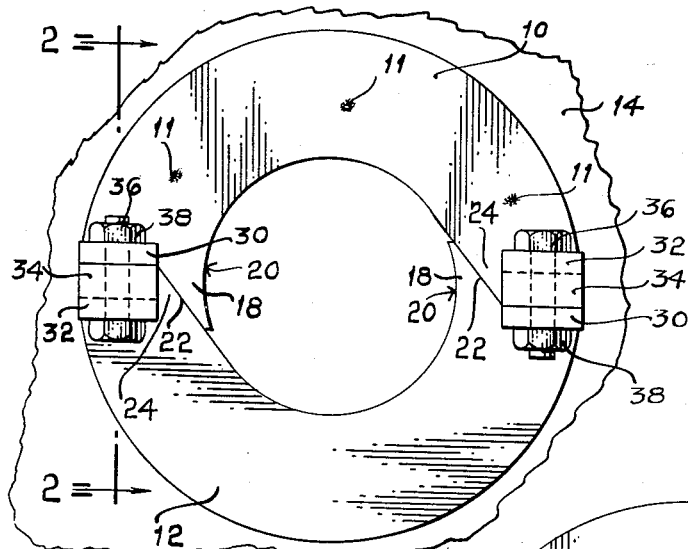
Figure 1 is a front elevational view of a hub attached to a sheet metal disc, most of which has been broken away.

As may best be seen by referring to Figure 2, one end of each sector terminates in an outwardly directed flange 30. The opposite end of each sector is provided with an outwardly directed flange 32 provided with an offset flange 34 abutting the end of the flange 30. The flanges 30 and 32 are apertured, so as to receive a bolt 36 provided with a nut 38. It can readily be seen that as the bolts 36, one on either side as shown in Figure 1, are tightened, the sector 12 will move relative to the disc 14 towards the shaft passing through the opening formed by the two sectors, so as to clamp the shaft. The tangential surfaces 22 exert a pressure against the wedge-shaped projection 18, so as to force the wedge-shaped projection 18 into intimate contact with the shaft. The offset flange 34, engaging the outer end of the flange 30, prevents the flanges from collapsing or deflecting towards each other at the outer ends. In other words, the flange 34 provides an abutment for the outer end of the flange 30, so as to hold the outer ends of the flanges 30 and 32 in spaced relation, so that as the nut 38 is tightened on the bolt 36, the sector 12 will be urged towards the sector 10. Ample space is provided between the two flanges 30 and 32, so as to permit drawing up of the sectors to firmly clamp the shaft. By providing two identical sectors, only one set of tools are required for producing the entire hub, resulting in low tooling costs and economical production.

It is to be noted that the inner surfaces of the two sectors 10 and 12 are smooth. For some purposes, especially where the load is rather light, this may be entirely satisfactory. However, for other purposes, it may be necessary to provide some means of locking the hub upon the shaft. In the modifications, various ways have been shown for accomplishing this result.

Figure 3:
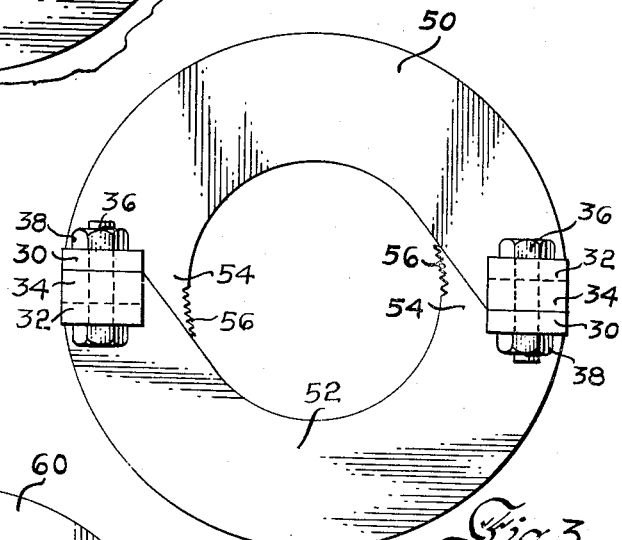
Figure 3 is a front plan view of a modified form of a hub.

In the modification that is disclosed in Figure 3, the two sectors 50 and 52 are identical in shape. For example, the sector 50 may be spot welded to a disc which has not been shown, the tapered wedge-shaped portions 54, one for the sector 50 and one for the sector 52, have each been provided with serrated teeth-like projections 56. The teeth or projections 56 are located under the wedge-shaped portions 54 of the sectors 50 and 52. The opposite ends of the sectors 50 and 52 are identical to the corresponding ends of the sectors 10 and 12. Likewise, the flanges 30, 32 and 34 are the same as those disclosed disclosed in the preferred embodiment. The flanges are provided with apertures receiving the bolts 36 provided with the nuts 38, used in clamping the two sectors 50 and 52 against a shaft. As the nuts 38 are tightened upon the bolts 36, it can readily be seen that the teeth 56 will gouge or dig into the surface of a shaft located in the center of the hub. Incidentally, in all of the embodiments the radius of curvature of all cylindrical surfaces should be substantially equal to the radius of the shaft.

In the modification disclosed in Figure 4, the sector 60 is provided with a key seat 64 registering with a key seat 66 in the shaft 70, so that a key 72 may be used to prevent the sectors 60 and 61 from rotating upon the shaft. The two sectors 60 and 61 are clamped together upon the shaft by means of a pair of bolts 36 extending through apertures into the flanges 30 and 32. After the key has been inserted into the key seats 64 and 66, the sectors 60 and 61 are clamped together by tightening the nuts 38 upon the bolts 36, so that they are firmly clamped against the shaft.

In Figure 5 an exploded view is shown of another modification. In this modification, the sector 80 is provided with a flattened portion 82. The sector 84 is identical to the sector 12 or the sector 61. The flattened portion 82 is adapted to be seated upon a flattened surface on the shaft to prevent rotation of the sectors 80 and 84 upon the nuts 38 being tightened upon the bolts 36 extending through the flanges 30 and 32. In this modification, projections 18 are identical to the projection shown in the preferred embodiment.

Although the modification disclosed in Figure 5 discloses a flat surface on the shaft, the shaft may be provided with any other type of irregular surface and the sectors of the hub may be provided with complementary surfaces, so that when the two halves of the hub are clamped together, the hub cannot rotate on the shaft. The hub should have sufficient thickness so as to provide a firm seat on the shaft. The angle of taper on the wedge-shaped projections may be increased or decreased, depending entirely upon the requirements of the particular hub structure. Instead of using flanges 30 and 32, as shown, any other suitable method of clamping the two halves together may be used.

Furthermore, instead of using a pair of bolts, the flanges or the projections on one end of the hubs could be made so as to interlock, thereby eliminating the necessity for one bolt and its nut. However, this would require a structure wherein the two halves would not be identical. Furthermore, the two halves on the two sectors being made out of stampings could consist of forgings or die castings.

In each of the modifications a structure has been produced wherein the tightening of the clamps against each other causes a wedge-shaped portion to be forcibly clamped against a shaft, so as to provide a hub that is easily produced, that firmly clamps a member to a shaft, that is dependable, efficient and provides a rigid connection between the shaft and the hub.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. A hub adapted to be non-rotatably clamped to a shaft or the like, said hub comprising two sheet metal arcuate sectors forming clamping members, each of said arcuate sectors having a cylindrical surface in the inner edge of the sector extending through an arc slightly less than 180°, one end of each sector having the edge thereof tapering so as to form a wedge-like portion, one surface being substantially tangential to the arcuate surface extended, the other end of each sector complementing the end having the wedge-like portion, said sectors cooperating to encircle the shaft, a pair of apertured flanges one on the end of one sector and the other on the end of the complementary sector, said flanges extending in a direction substantially normal to the plane of the main body of the sectors, a fastening element engaging said flanges for forcing the flanges toward one another at an angle to said tangential surface, thereby drawing the clamping members together so as to wedge the wedge-like portions into clamping engagement with the shaft, one of the flanges having an offset flange directed toward the flange of the other sector and engaging the end thereof so as to prevent the ends of the flanges from collapsing toward each other when forced together by the fastening element, and means on the opposite ends of the sectors for holding the other ends of the sectors together.

2. A hub according to claim 1, wherein the inner cylindrical surface of at least one of the sectors is interrupted, the interrupted portion of the cylindrical surface being utilized to lock the hub on the shaft.

3. A hub according to claim 1, wherein the tapering wedge-like portion is provided with internally directed teeth adapted to gouge into a shaft on which the hub is mounted.

4. A hub according to claim 1, wherein one of the sectors is provided with a key seat adapted to have a key mounted therein for locking the hub to the shaft.

5. A hub according to claim 1, wherein one of the sectors has the inner cylindrical surface interrupted by a surface lying in a plane and forming a chord adapted to engage a flattened surface on the shaft so as to prevent rotation thereof.

References Cited in the file of this patent

UNITED STATES PATENTS

| 770,501 | Kottusch | Sept. 20, 1904 |
| 1,259,310 | Starker | Mar. 12, 1918 |
| 1,904,535 | Richards | Apr. 18, 1933 |
| 2,042,263 | La Valley | May 26, 1936 |

FOREIGN PATENTS

| 164,976 | Germany | Nov. 11, 1905 |